OR    4,057,317    R

United States P~~atent~~ [19]  T350 - 3.85 ✓

Upatnieks 4,057,317

Nov. 8, 1977

[54] HOLOGRAM PROJECTOR

[75] Inventor: Juris Upatnieks, Ann Arbor, Mich.

[73] Assignee: Environmental Research Institute of Michigan, Ann Arbor, Mich.

[21] Appl. No.: 634,147

[22] Filed: Nov. 21, 1975

[51] Int. Cl.² ............................................. G02B 27/00
[52] U.S. Cl. ....................................... 350/3.5; 353/46
[58] Field of Search ......................................... 350/3.5

[56] References Cited

U.S. PATENT DOCUMENTS 3,949,191    4/1976    Sutherlin et al. .................. 350/3.5 X

OTHER PUBLICATIONS

Harris et al, Information Display, Apr. 1970, pp. 23-27 and 48.
Supertzi et al, J. Optical Society of America, vol. 56, 1966, pp. 524-525.

*Primary Examiner*—John K. Corbin
*Assistant Examiner*—John D. Lee
*Attorney, Agent, or Firm*—Krass & Young

[57] ABSTRACT

A projector for casting the image of a section of an object recorded on a hologram includes a laser for illuminating a section of the hologram and a lens for focusing a section of the reconstructed virtual image on a screen. The hologram is formed as a cylindrical section surrounding the object, on film, and is stored on a pair of parallel spools. A coherent light beam illuminates a section of the hologram arrayed between the spools and an adjustment mechanism which moves an optical element in the reconstructing beam path and the projecting lens allows adjustment of the illuminated section along an axis parallel to the spools. The projecting lens assembly has an adjustable focal length allowing it to project images at varying depths of the resultant virtual image. The projected image of a section of the object may be changed by rotating the reels to give the effect of viewing the object from differing angles or changing the height of the illuminated section to give the illusion of viewing the object from different heights.

10 Claims, 7 Drawing Figures

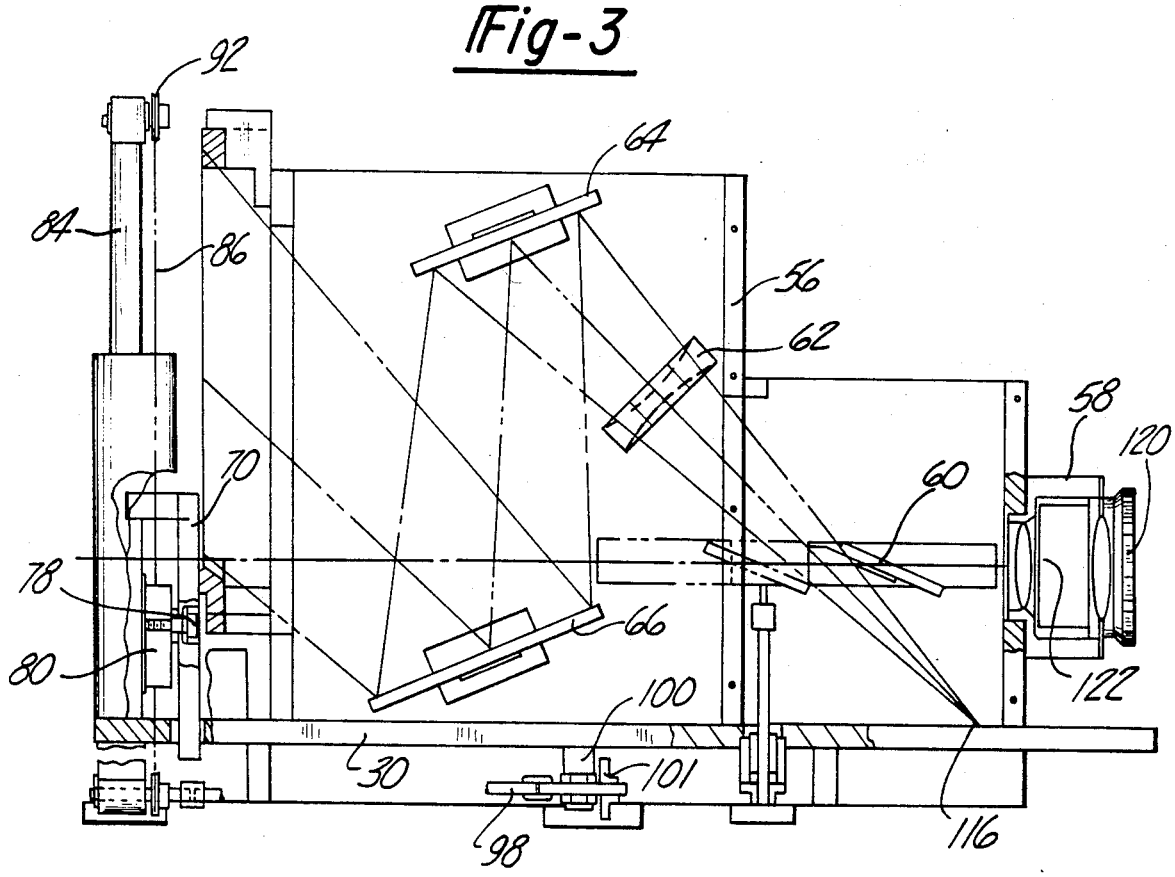
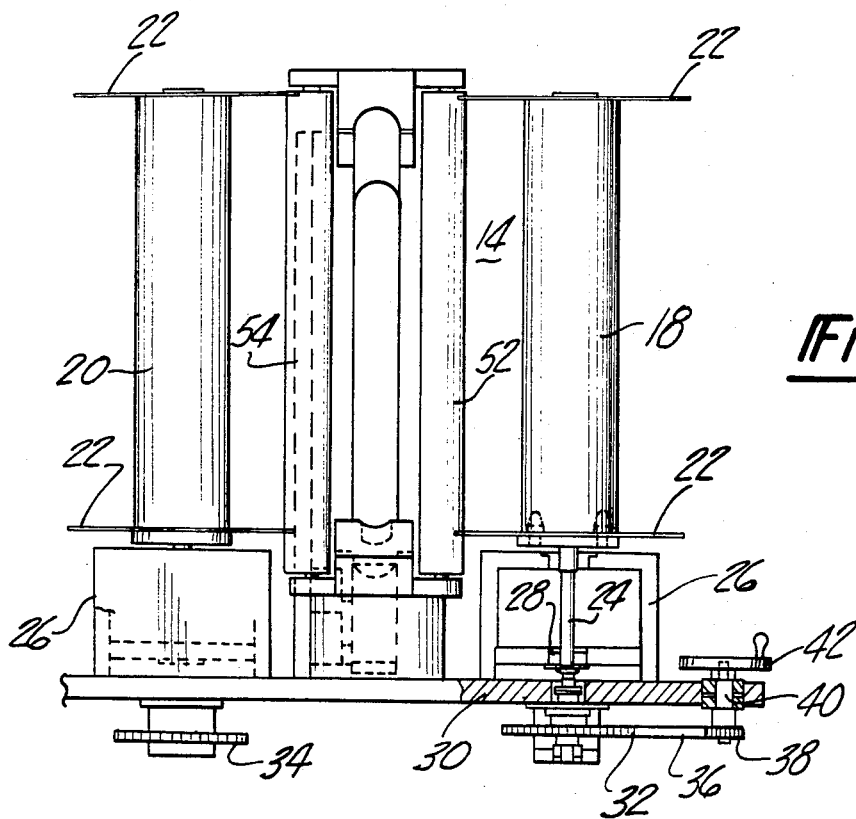

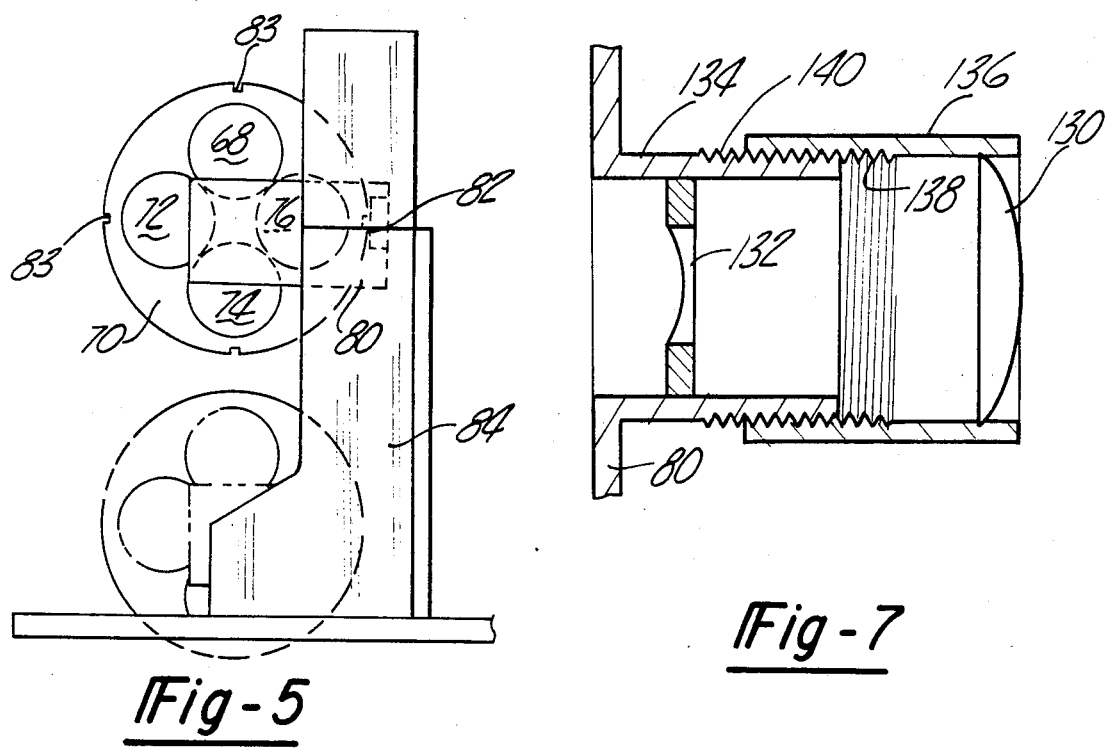
Fig-5
Fig-7
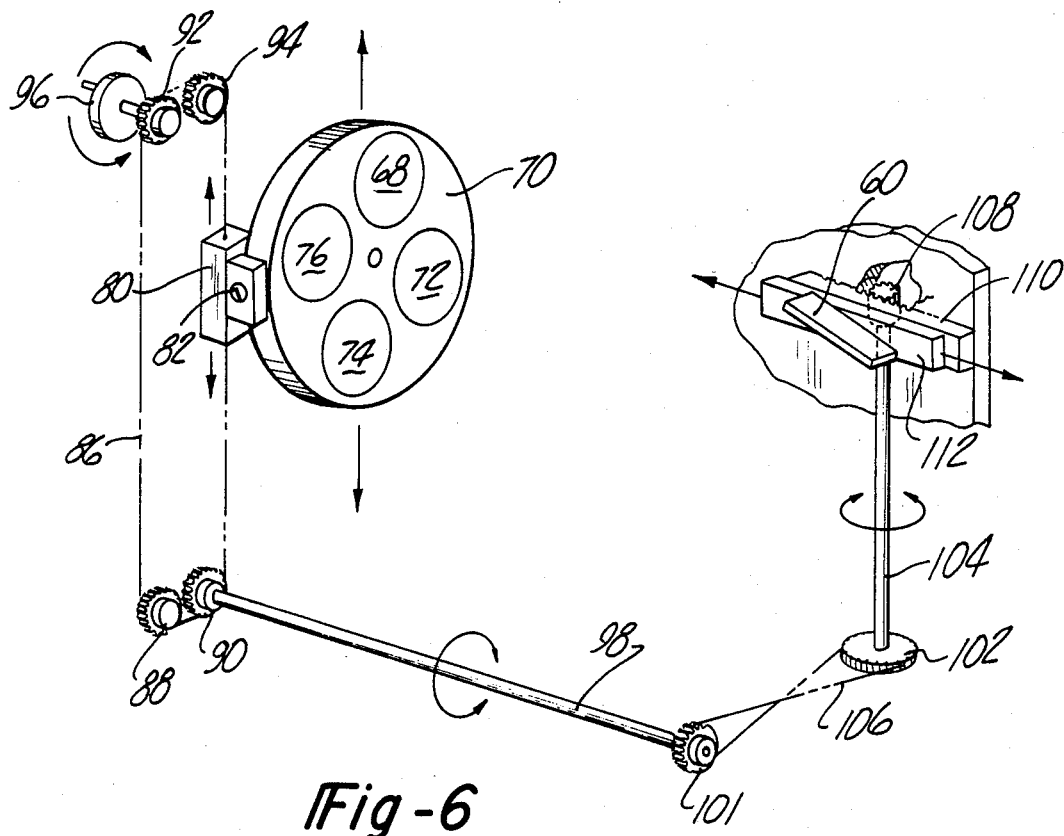
Fig-6

HOLOGRAM PROJECTOR

BACKGROUND OF THE INVENTION

1. Field of the Invention

This invention relates to apparatus for projecting a real, two-dimensional image of a section of a scene recorded on a hologram and more particularly to such a projector which is adjustable to allow modification of the section of the stored information which is projected.

2. Prior Art

When a hologram is illuminated with an appropriate reconstructing light beam the fringes refract the light to produce both virtual and real images of the recorded wavefronts. An observer looking through the illuminated hologram sees the virtual image and to observe a screened projection of the recorded wavefronts the conjugate or real image is typically projected on a screen. The resulting projected image had to be of the same size as the original. If an attempt was made to magnify the image by using an illuminating beam having a different degree of divergence than the reference beam which was used to form the hologram the resulting image would be aberrated. Accordingly, viewing the real image as projected on a screen may represent a useful technique for a single observer but is not suitable for group presentations. Use of the projected conjugate image also presents difficulties in that the position of the screen relative to the hologram must be varied in order to view the reconstructed image from different angles or to view a different plane in the object.

The present invention is broadly directed toward a system for projecting real images recorded on holograms which overcomes these limitations of previous techniques and provides much more versatility in terms of variations in the projected image.

SUMMARY OF THE INVENTION

The present invention broadly relates to apparatus for illuminating a section of a hologram with a reconstructing beam to form a virtual image of the scene encoded in the hologram and means for projecting a magnified real image of at least sections of the virtual image onto a display screen. The apparatus employs a lens or lens system to project the virtual image. By adjusting the focal length of the lens, the plane of the three-dimensional virtual image that is projected onto the screen is controlled. This gives the operator the ability to focus in on any particular plane within the field of view of the hologram.

The projector includes means for illuminating a relatively small section of the hologram at any one time and for moving the illuminating beam relative to the hologram both horizontally and vertically to change the angle of view of the scene being projected. In a preferred embodiment of the invention the hologram is formed employing a photographic media which at least partially surrounds the object. When the section of the hologram illuminated is changed along the horizontal, this effectively rotates the angle of an observer relative to the projected image of the scene. A change in the area of the hologram illuminated by the beam along the vertical axis effectively modifies the elevation from which the observer views the projected image. Using the control over the plane of the image which is focused on the screen and the two-axis control over the angle of observation of the scene enables the observer to thoroughly study an object which is the subject of the hologram and to give detailed attention to particular sections of the object as required.

A preferred embodiment of the invention, which will subsequently be described in detail, employs a laser as the source of the reconstructing beam. The beam is reflected by a first mirror, adjustable along the axis of the beam, to a negative lens which expands the beam diameter and cooperates with the movable mirror to steer the emerging beam so that motion of the mirror effectively rotates the beam about its apparent point source. The beam is then reflected by a pair or mirrors which fold it to reduce the required distance between the lens and the hologram to achieve a given width of divergence for the beam.

The hologram itself is preferably formed on flexible film so that it may be reeled between a pair of spools. The diverging beam illuminates a section of the hologram arrayed between the spools. A lens supported on the side of the hologram opposite to the source projects a focused plane in the virtual image onto the screen. This lens is supported for vertical movement along the hologram and is vertically driven by the same mechanism that moves the mirror. A motion of the mirror changes the elevation of intersection of the diverging beam with the hologram and the lens follows this motion to maintain its focus on the reconstructed virtual image.

In one embodiment of the invention a lens turret is provided with several lenses of differing focal length. In an alternative embodiment control of the focal length of the lens over a continuous range is achieved by a lens set consisting of a positive lens and a negative lens which are adjustably spaced relative to one another. A change in their spacing changes the focal length and accordingly changes the plane of the virtual image that is projected onto the screen. A real image projected by this system may be magnified without any aberration of the image so that a number of viewers may observe the screen display at the same time.

Other objectives, advantages and applications of the present invention will be made apparent by the following detailed description of these preferred embodiments. The description makes reference to the accompanying drawings in which:

FIG. 3 is a side view of the preferred embodiment of the projector with certain parts broken away for purposes of illustration;

FIG. 4 is a front view of the projector with the lens turret removed;

FIG. 5 is an elevational view of the lens turret and its supporting slide;

FIG. 6 is a schematic diagram illustrating the mechanism for moving the beam elevation adjusting mirror; and FIG. 7 is a schematic diagram of an alternative form of a projecting lens for use with the invention.

Figure 1:
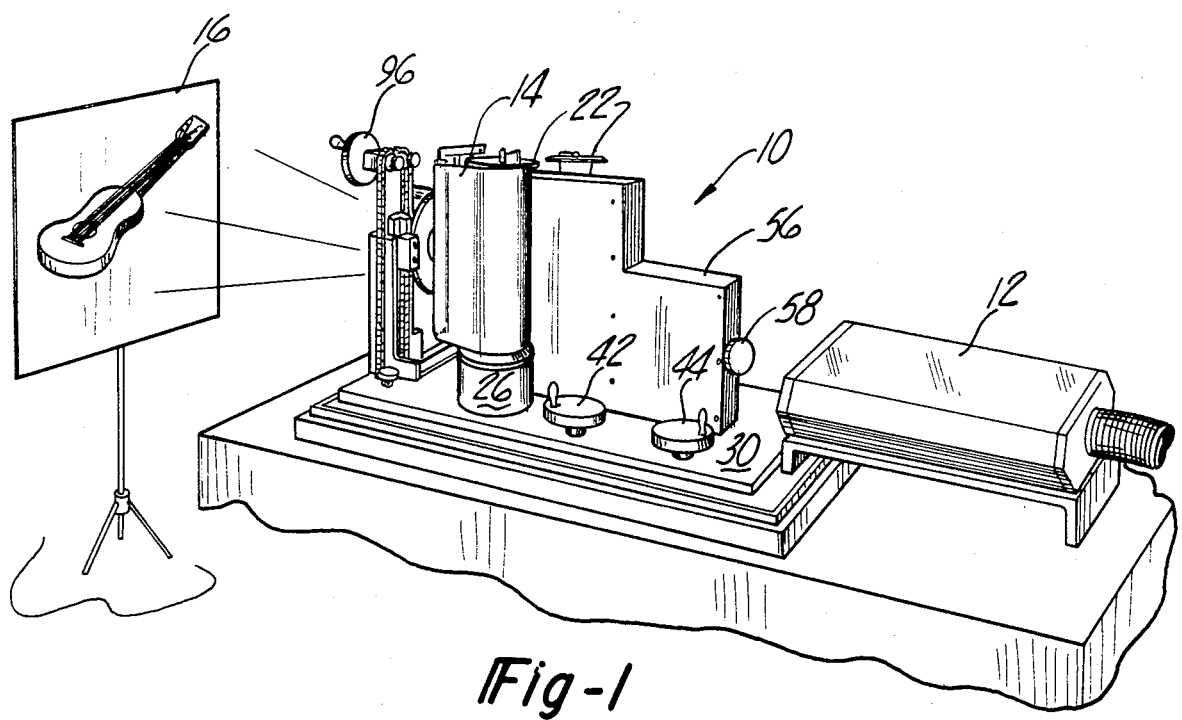
FIG. 1 is a perspective view of a preferred embodiment of the inventive projector and a screen displaying the projected image.
Figure 2:
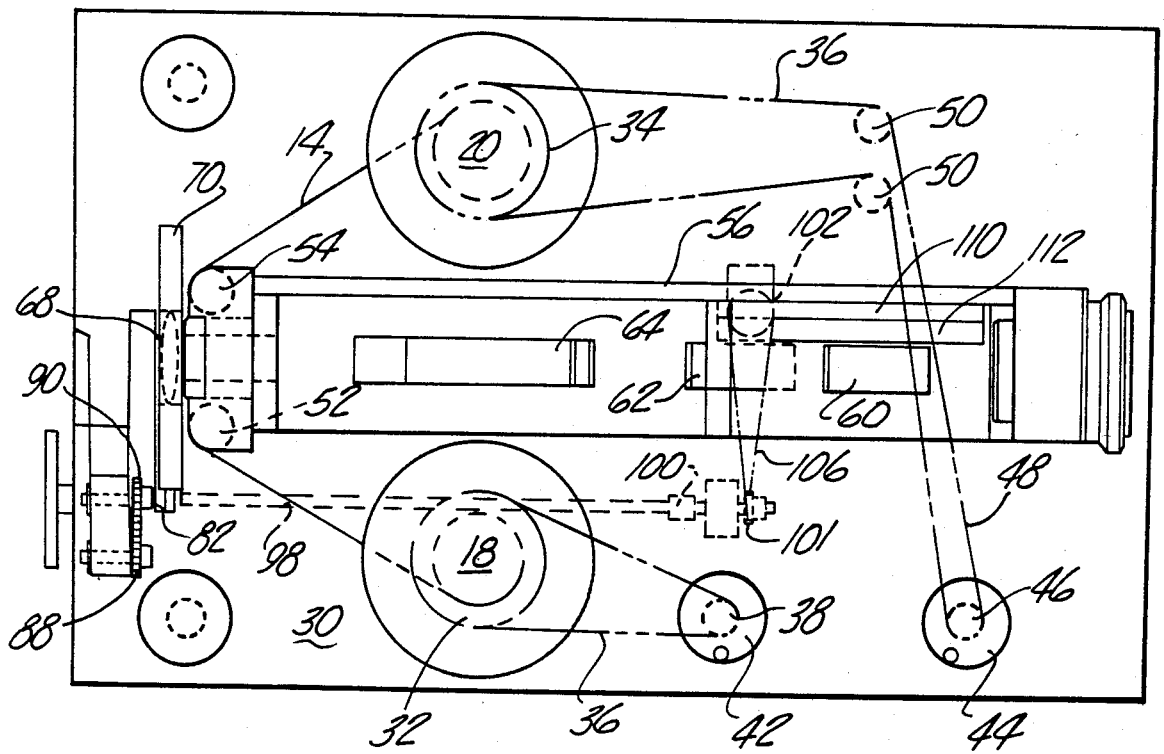
FIG. 2 is a top view of the projector of FIG. 1.

Referring to FIG. 1, a hologram projector forming a preferred embodiment of the invention, generally indicated at 10, employs a laser 12 as a source of reconstructing light and projects a real image of light wavefronts recorded on a section of a hologram 14 onto a viewing screen 16.

In the preferred embodiment of the invention only a small part of the information stored in the hologram 14 is projected at one time. The hologram is formed on flexible film, and preferably represents the light wavefronts intersecting a photographic media arrayed cylindrically about the object. The hologram may represent a full 360° cylindrical section surrounding the object or some part thereof. A variety of techniques are known for forming such cylindrical holograms.

The hologram is supported on a pair of spaced vertical spools 18 and 20 with opposite edges of the hologram attached to the spools and wound about the spools so that a section of the hologram is arrayed between the spools. The orientation of the hologram is preferably such that a line along the hologram perpendicular to the axes of the spools lies in the horizontal plane, but other relationships could hold. The spools each have end caps 22 at their upper and lower ends and the hologram fits between these end caps.

As is best seen in FIG. 4, axial shafts 24 are affixed to the lower end of each of the spools 18 and 20 and extend downwardly into a pair of bearing housings 26. The shafts 24 are retained on bearings 28 fixed within the housing and their ends project below a base plate 30 which supports the projector 10. A gear 32 is fixed to the lower end of the shaft 24 projecting downwardly from spool 18 and a gear 34 is affixed to the lower end of the shaft projecting downwardly from the spool 20.

The gear 32 and spool 18 may be rotated by a chain 36 which is arrayed over that gear, and over a gear 38 affixed to the bottom of a shaft 40 which projects through the plate 30 and has a manual crank 42 affixed to its upper end, above the plate 30. Similarly, the gear 34 and its spool 20 may be rotated by means of a crank 44 which has a gear 46 connected to is lower end, below the table 30. The gear drives a chain 48 arrayed over a pair of idler gears 50 which are rotatably supported beneath the table, and over the gear 34. By rotating the hand cranks 42 and 44 in synchronism, the section of hologram 14 arrayed between the spools 18 and 20 may be changed. The crank support mechanisms may include friction clutches (not shown) to maintain tension on the hologram.

This section of the hologram passes over a pair of vertical rolls 52 and 54 rotatably supported on the forward end of an optics housing 56. The housing 56 extends upwardly from the base 30 and processes the raw light beam received from the laser 12.

The beam from the laser passes into the housing 56 through an adjustable lens assembly 58. The beam then impinges upon a plane mirror 60 adjustably supported for motion in the horizontal plane, along the axis of the laser beam, in a manner which will be subsequently described. The mirror 60 reflects the beam through a negative lens 62 supported on the optics housing 56. This lens expands the laser beam and acts in combination with the movable mirror 60 to steer the laser beam across the hologram in the vertical direction.

The diverging beam from the negative lens 62 is reflected by a pair of plane mirrors 64 and 66 which simply fold the beam to shorten the length of the projector and still obtain the desired beam diameter at the output. The diverging beam reflected by the folding mirror 66 passes through the section of the hologram arrayed between the rolls 52 and 54. A positive lens 68, supported on a rotatable turret 70 images a section of the resulting virtual image onto a screen 16.

The lens turret 70 contains four lenses 68, 72, 74 and 76 of differing focal length. In a preferred embodiment of the invention, the lenses may have focal lengths of 20, 30, 50 and 100 centimeters. The turret is rotatably supportable about an axis 78 (FIG. 3), projecting from a head 80. A detent mechanism 82 supported on the head 80 engages notches 83 formed at four points about the perimeter of the turret 70 to position one of the four lenses in operating relationship to the projector.

The head 80 is supported for vertical movement along a vertical way 84 which extends upwardly from the forward end of the base. The head is moved along the way by a chain 86 which is arrayed over a pair of gears 88 and 90 under the base 10 and a pair of gears 92 and 94 rotatably supported directly above the gears 88 and 90 respectively on the top of the way 84. A manual crank 96 is rotatably supported on the top of the way 84 and has its shaft connected to the gear 92 to move the chain when rotated. This action moves the turrets 70 vertically.

The gears 90 also drive a horizontal shaft 98 rotatably supported on the underside of the base 30 by a bushing 100. The opposite end of the shaft 98 supports a gear 101 which connects to a gear 102 affixed to the lower end of a vertical shaft 104, by a driving chain 106. The shaft 104 is rotatably supported with respect to the optics housing 56 and has a gear 108 affixed to its upper end. The gear 108 engages an elongated rack 110. The rack 110 is formed on one side of the slide member 112 and supports the mirror 60.

As best seen in FIG. 6, rotation of the hand crank 96 causes vertical motion of the head 80 and its supported turret 70 and synchronized sliding motion of the mirror 60 along the axis of the laser beam exiting from the lens assembly 58. Sliding motion of the mirror 60 causes the reflected beam to be effectively steered by the negative lens 62 so that its position rotates about an apparent source indicated at 116 in FIG. 3. FIG. 3 indicates the locus of the center of the beam for the two extreme positions of the mirror 60. The coordinated vertical motion of the turret 70 maintains the operating lens of that turret centered on the section of the hologram illuminated by the beam.

In a preferred embodiment of the invention, the laser may be a 40 milliwatt argon laser with a green or blue color selection.

In operation, the laser is energized and the beam after passing through the objective lens and being reflected by the mirror 60, is diverged by the lens 62 and reflected by the mirrors 64 and 66 to a relatively narrow point on the hologram. The beam diameter at the hologram may be about ¼ inch. This forms an original size virtual image of the object recorded, behind the hologram. The selected lens of turret 70 is in the proper positon to project it to the screen. By changing the lens employed in the turret, different planes of the image will be focused on the screen 16.

The lens assembly 58 includes a pair of lenses 120 and 122 which are supported for telescoping motion toward and away from one another. The diameter and divergence of the section of the illuminating beam which impacts the hologram can be changed by changing the spacing between the lenses 120 and 122. Adjusting the spacing of the lenses to increase the diameter of the beam decreases the depth of field observable in the projected image but increases the resolution of the image.

In order to eliminate speckle, the screen 16 has a fluorescent coating that absorbs light at the laser frequency and re-emits light of a different frequency.

In FIG. 1 a guitar is illustrated as the object which is the subject of the hologram and is projected on the screen 16 by the projector 10. To view the guitar from other horizontal angles, as if walking about the guitar, the hand cranks 42 and 44 may be rotated to change the section of the hologram arrayed between the rollers 52 and 54.

To view the guitar from different vertical angles, the hand crank 96 may be rotated, changing the position of the lens turret 70 and the sliding mirror 60, thus illuminating a different vertical section on the hologram. To change the plane of focus projected on the screen, the lens turret is rotated.

FIG. 7 illustrates an alternative form of construction for the projecting lens used with the system. Rather than providing a turret containing a plurality of lenses of differing focal lengths, as in the embodiment of FIGS. 1-6, the alternative embodiment employs a variable focal length arrangement employing a positive lens 130 and a negative lens 132. The negative lens 132 is supported in a cylindrical member 134, attached to the vertically movable head 80 so that the center of the lens 132 is located on the center line of the virtual image reconstructed from the hologram by the light beam. The positive lens 130 is spaced from the negative lens and supported in a cylindrical housing 136, having internal threads 138 which engage with external threads 140 formed on the outer diameter of the housing member 134. By rotating the housing 136 the spacing between the positive and negative lenses is adjusted. This varies the object plane imaged by the lens set on a projection screen.

The order of the positive and negative lenses could be reversed but this arrangement provides a relatively limited variation of focal length.

I claim:

1. A projector for creating a two-dimensional image on a planar surface from a hologram, comprising: means for supporting the hologram; a source of an illuminating light beam; means for directing said light beam at various sections of said hologram by moving said light beam relative to said hologram along two perpendicular axes so as to be operative to illuminate said sections of said hologram to create a three-dimensional image of the object in space; lens means operative to project a magnified image of said sections of said three-dimensional image created by said light beam; means for selectively varying the focal plane of the image projected by said lens means within said three-dimensional image.

2. The projector of claim 1 wherein said means selectively varying the focal plane of the projected image comprises said lens means having an adjustable focal length so as to be able to project images of various planes of said three-dimensional image.

3. The projector of claim 2 wherein said lens means of adjustable focal length comprises a plurality of separate lenses of differing focal length supported on means movable relative to said hologram support.

4. The projector of claim 2 wherein said lens means of adjustable focal length comprises a compound lens having a plurality of elements movable relative to one another.

5. The projector of claim 1 wherein said hologram is formed on an elongated flexible section having its transverse edges fixed to a pair of spools, and said means for directing the said illuminating beam relative to the hologram includes means for rotating the spools to change the section of hologram illuminated by the beam.

6. The projector of claim 5 wherein the hologram is formed on an arcuate surface at least partially surrounding the object so that motion of the hologram relative to the beam by rotation of the spools produces successive images of the object from points bearing different angles relatve to the object.

7. The projector of claim 1 wherein said source of said light beam includes a light beam apparently emanating from a constant point source and wherein said means for directing a said light beam includes means adjusting the angle of incidence thereof between the light beam and the hologram.

8. The projector of claim 7 wherein means for adjusting the angle of incidence between said apparent source for said illuminating beam and the hologram includes an optical element supported between the source of the illuminating beam and the hologram and means for moving said optical element relative to the hologram.

9. The projector of claim 1 including means connecting said lens means to said means directing said light beam so that the projecting lens moves along one of the two axes in synchronism with said light beam to project an image stored on the section of the hologram illuminated by the beam.

10. The projector of claim 1 wherein said source of a light beam includes a pair of lenses supported in adjustable relationship with respect to one another, and means for adjusting the spacing between the lenses to control the diameter of the section of the beam which illuminates the hologram.

* * * * *